United States Patent
Fischer et al.

(10) Patent No.: US 6,877,525 B2
(45) Date of Patent: Apr. 12, 2005

(54) CHECK VALVE FOR FUEL PUMP

(75) Inventors: John Gardner Fischer, Goodrich, MI (US); Robert A. Roth, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 146 days.

(21) Appl. No.: 10/035,602

(22) Filed: Nov. 7, 2001

(65) Prior Publication Data

US 2003/0084941 A1 May 8, 2003

(51) Int. Cl.$^7$ ............................................. F16K 15/02
(52) U.S. Cl. ........................ 137/541; 137/542; 137/538
(58) Field of Search ................................ 137/536, 538, 137/541, 542

(56) References Cited

U.S. PATENT DOCUMENTS

| | | | |
|---|---|---|---|
| 287,004 A | * 10/1883 | Cullingworth | ............... 137/541 |
| 774,340 A | 11/1904 | Smith | |
| 1,759,081 A | 5/1930 | Anderson | |
| 2,011,333 A | * 8/1935 | Clifton | ........................ 137/538 |
| 2,080,760 A | * 5/1937 | Condon | ....................... 137/542 |
| 2,206,356 A | * 7/1940 | Hutchings | ................... 137/538 |
| 2,285,997 A | 6/1942 | Mino | |
| 2,342,659 A | 2/1944 | Grove et al. | |
| 2,367,106 A | 1/1945 | Dolch | |
| 2,380,459 A | 7/1945 | Niesemann | |
| 2,564,894 A | 8/1951 | Glasgow | |
| 2,569,316 A | 9/1951 | Jerman | |
| 2,599,898 A | 6/1952 | Dalrymple | |
| 2,646,071 A | 7/1953 | Wagner | |
| 2,752,933 A | 7/1956 | Olson | |
| 2,809,660 A | 10/1957 | Becker | |
| 2,842,150 A | 7/1958 | Olson | |
| 2,884,952 A | 5/1959 | Mason et al. | |
| 2,939,475 A | 7/1960 | Roach | |
| 2,949,931 A | 8/1960 | Ruppright | |
| 3,026,903 A | 3/1962 | Roach | |
| 3,039,658 A | 6/1962 | Hoelle | |
| 3,057,374 A | * 10/1962 | Gondek | ....................... 137/538 |
| 3,125,119 A | * 3/1964 | Richgels | ...................... 137/538 |
| 3,180,354 A | 4/1965 | Grose | |
| 3,202,177 A | * 8/1965 | Klein | ............................ 137/538 |
| 3,234,959 A | 2/1966 | Feinberg | |
| 3,272,218 A | 9/1966 | Johnson | |
| 3,294,116 A | * 12/1966 | Tremeau | ...................... 137/541 |
| 3,297,049 A | 1/1967 | Moskovitz | |
| 3,425,444 A | 2/1969 | Jones | |
| 3,443,579 A | 5/1969 | Doolittle | |
| 3,485,441 A | 12/1969 | Eaton, Jr. | |
| 3,756,273 A | 9/1973 | Hengesbach | |
| 3,773,440 A | 11/1973 | Tateishi | |
| 3,937,250 A | 2/1976 | Golan et al. | |
| 3,955,595 A | 5/1976 | Modes | |
| 4,003,405 A | 1/1977 | Hayes et al. | |

(Continued)

FOREIGN PATENT DOCUMENTS

| | | |
|---|---|---|
| FR | 1.088.616 | 3/1955 |
| JP | 2078408 | 3/1990 |

*Primary Examiner*—John Rivell
(74) *Attorney, Agent, or Firm*—Jimmy L. Funke

(57) ABSTRACT

A check valve for a fuel pump of a vehicle includes a valve housing adapted to be disposed in an outlet member of the fuel pump and a valve seat formed on the valve housing. The check valve also includes a valve member disposed in the valve housing and having a closed position to engage the valve seat to prevent fuel from flowing through the outlet member and an open position to allow fuel to flow through the outlet member. The valve member has at least one outlet port a predetermined dwell distance from the valve seat when the valve member is in the closed position and allows fluid flow past the valve seat when the valve member is in the open position.

12 Claims, 3 Drawing Sheets

U.S. PATENT DOCUMENTS

| | | |
|---|---|---|
| 4,078,577 A | 3/1978 | Brown |
| 4,129,145 A | 12/1978 | Wynn |
| 4,149,559 A | 4/1979 | Wormser |
| 4,237,918 A | 12/1980 | German |
| 4,275,759 A | 6/1981 | Huang |
| 4,325,343 A | 4/1982 | Turner |
| 4,343,328 A | 8/1982 | Junger |
| 4,352,377 A | 10/1982 | Fritchman |
| 4,424,830 A | 1/1984 | Arnsperger et al. |
| 4,697,995 A | 10/1987 | Tuckey |
| 4,744,387 A | 5/1988 | Otteman |
| 4,756,281 A | 7/1988 | Chen et al. |
| 4,799,930 A | 1/1989 | Knoch et al. |
| 4,813,452 A * | 3/1989 | Smith .................... 137/542 |
| 4,874,012 A | 10/1989 | Velie |
| 4,938,254 A | 7/1990 | Gimby |
| 4,964,391 A | 10/1990 | Hoover |
| 5,036,881 A | 8/1991 | Southmayd |
| 5,084,166 A | 1/1992 | Shiraga et al. |
| 5,130,014 A | 7/1992 | Volz |
| 5,320,136 A | 6/1994 | Morris et al. |
| 5,406,922 A | 4/1995 | Tuckey |
| 5,415,146 A | 5/1995 | Tuckey |
| 5,421,306 A | 6/1995 | Talaski |
| 5,513,395 A | 5/1996 | Chlebek et al. |
| 5,525,048 A | 6/1996 | Tuckey |
| 5,577,892 A | 11/1996 | Schittler et al. |
| 5,623,910 A | 4/1997 | Riggle |
| 5,665,229 A | 9/1997 | Fitzpatrick et al. |
| 5,727,529 A | 3/1998 | Tuckey |
| 5,728,292 A | 3/1998 | Hashimoto et al. |
| 5,785,025 A | 7/1998 | Yoshiume et al. |
| 5,799,688 A | 9/1998 | Yie |
| 5,918,852 A | 7/1999 | Otto |
| 6,070,605 A | 6/2000 | Steenburgh |
| 6,260,530 B1 | 7/2001 | Keon, Jr. |
| 6,341,623 B1 | 1/2002 | Channing |
| 6,401,749 B1 | 6/2002 | Tai et al. |
| 6,422,265 B1 | 7/2002 | Beyer et al. |
| 6,505,644 B2 | 1/2003 | Coha et al. |
| 6,622,707 B2 | 9/2003 | Begley et al. |
| 6,622,708 B2 | 9/2003 | Braun et al. |

* cited by examiner

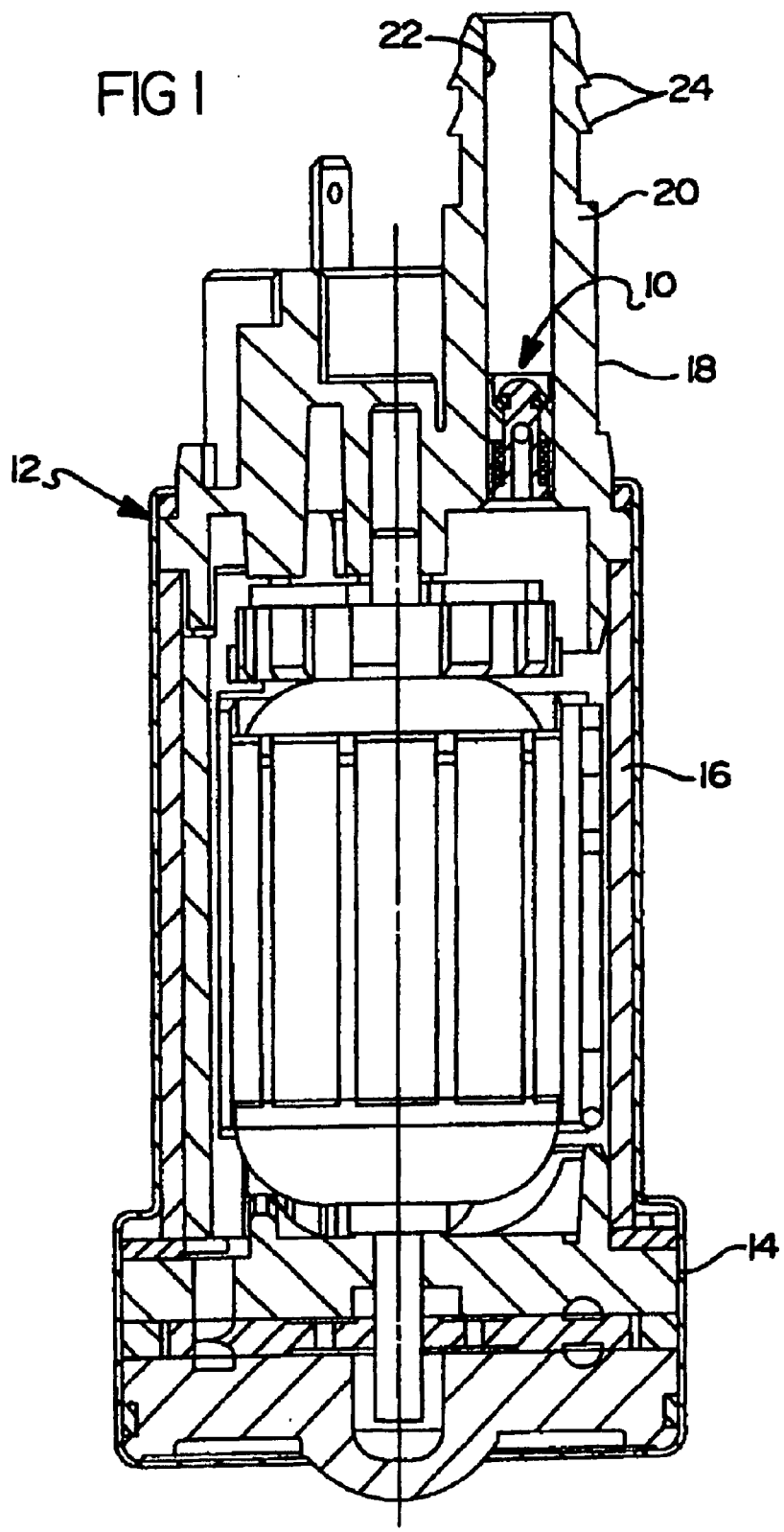

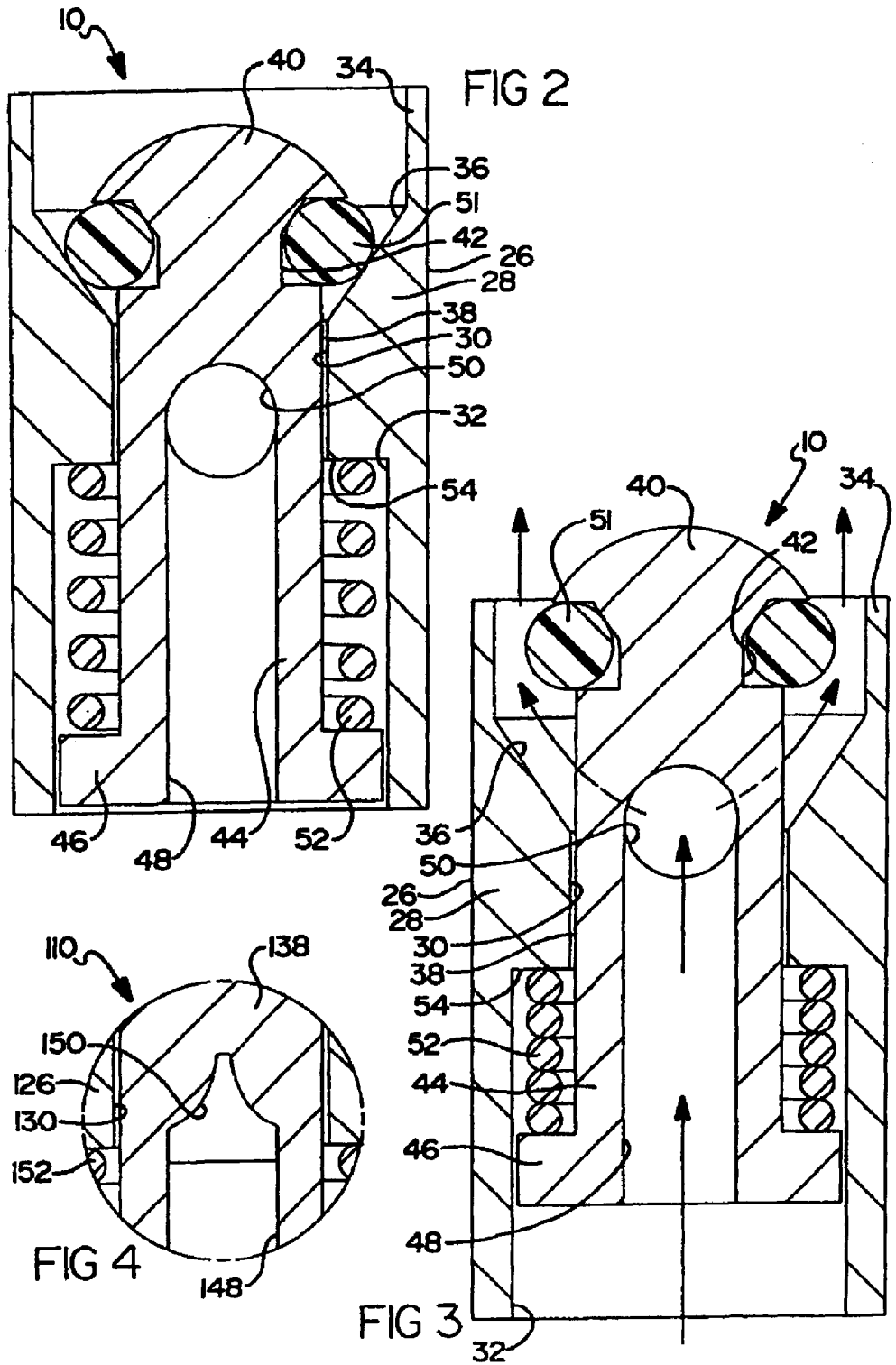

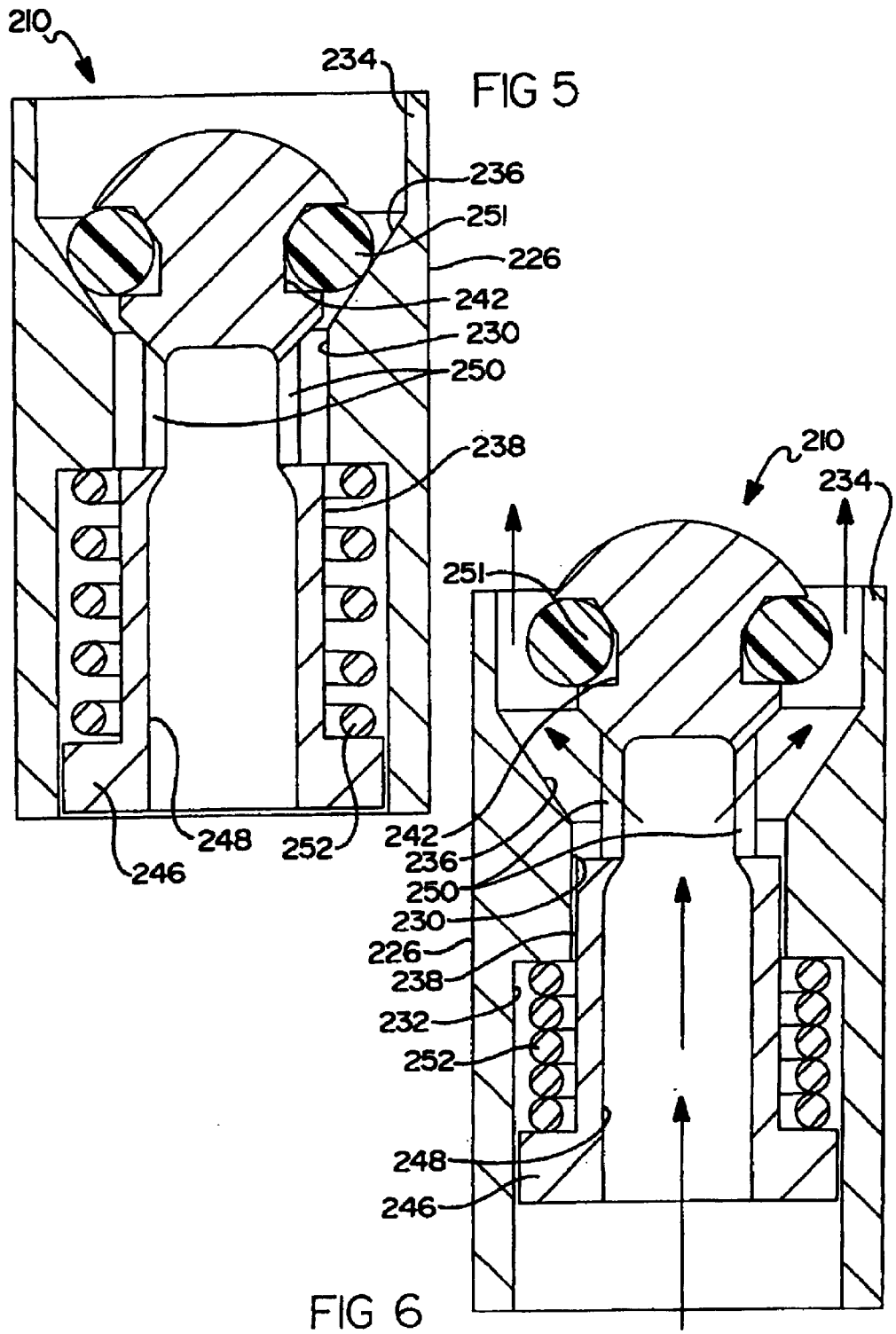

CHECK VALVE FOR FUEL PUMP

TECHNICAL FIELD

The present invention relates generally to fuel pumps for vehicles and, more particularly, to a check valve for a fuel pump of a vehicle.

BACKGROUND OF THE INVENTION

It is known to provide a fuel tank in a vehicle to hold fuel to be used by an engine of the vehicle. It is also known to provide a fuel pump inside the fuel tank to pump fuel to the engine. Typically, the fuel pump includes a check valve to allow fuel to exit the fuel pump. Generally, a forward flow check valve consists of a checking device, typically a plunger, such as a pintel having a seal, and a seat that when in contact form a leak proof seal. The pintel and seal are forced against the seat with a spring that provides the proper force to maintain pintel and seal to seat contact during no flow and low-pressure forward flow conditions. In automotive fuel pump applications, this force prevents flow from exiting the fuel tank when the vehicle fuel line is removed or severed.

Forward flow check valves having a pintel and seal can exhibit difficulties during low pintel travel conditions. During these conditions, a small flow area between the seal and seat creates a high velocity flow stream that creates a low-pressure venturi area, forcing the seal towards the seat. This venturi effect creates a high restriction by preventing the pintel from traveling and increasing the flow area. In addition, these check valves can exhibit oscillation if the annular area between the seal and the seat changes suddenly.

Therefore, it is desirable to provide a check valve in a fuel pump for a vehicle that eliminates a high restriction during low pintel travel conditions. It is also desirable to provide a check valve for a fuel pump that eliminates oscillation of the pintel. It is further desirable to provide a check valve for a fuel pump at a relatively low cost. Therefore, there is a need in the art for a check valve that meets these desires.

SUMMARY OF THE INVENTION

It is, therefore, one object of the present invention to provide a new check valve for a fuel pump of a vehicle.

It is another object of the present invention to provide a check valve for a fuel pump that eliminates high restriction during low pintel travel conditions.

It is yet another object of the present invention to provide a check valve for a fuel pump that eliminates pintel oscillations.

To achieve the foregoing objects, the present invention is a check valve for a fuel pump of a vehicle including a valve housing adapted to be disposed in an outlet member of the fuel pump. The check valve also includes a valve seat formed on the valve housing. The check valve includes a valve member disposed in the valve housing and cooperating with the valve seat. The valve member has a closed position to engage the valve seat to prevent fuel from flowing through the outlet member and an open position to allow fuel to flow through the outlet member. The valve member has at least one outlet port a predetermined dwell distance from the valve seat when the valve member is in the closed position and allowing fluid flow past the valve seat when the valve member is in the open position.

One advantage of the present invention is that a new check valve is provided for a fuel pump of a vehicle. Another advantage of the present invention is that the check valve has a pintel that must travel a given dwell distance away from the valve seat before an outlet port is exposed, allowing an increase in flow area to prevent low flow restriction. Yet another advantage of the present invention is that the check valve has performance and efficiency improvements due to lower flow restriction through the check valve. Still another advantage of the present invention is that the check valve has reduced noise generation due to elimination of pintel oscillations. A further advantage of the present invention is that the check valve has a low cost design.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a fragmentary elevational view of a check valve, according to the present invention, illustrated in operational relationship with a fuel pump.

FIG. 2 is an enlarged fragmentary elevational view of the check valve of FIG. 1 illustrating a closed position.

FIG. 3 is a view similar to FIG. 2 illustrating the check valve in an open position.

FIG. 4 is an enlarged fragmentary elevational view of another embodiment, according to the present invention, of the check valve of FIG. 1.

FIG. 5 is an enlarged fragmentary elevational view of yet another embodiment, according to the present invention, of the check valve of FIG. 1 illustrating a closed position.

FIG. 6 is a view similar to FIG. 5 illustrating the check valve in an open position.

DESCRIPTION OF THE PREFERRED EMBODIMENT

Referring to the drawings and in particular FIGS. 1 through 3, one embodiment of a check valve 10, according to the present invention, is shown for a fuel pump, generally indicated at 12, of a vehicle (not shown) The fuel pump 12 includes a pump section 14 at one axial end, a motor section 16 adjacent the pump section 14 and an outlet section 18 adjacent the motor section 16 at the other axial end. As known in the art, fuel enters the pump section 14, which is rotated by the motor section 16, and is pumped past the motor section 16 to the outlet section 18. The outlet section 18 has an outlet member 20 extending axially with a passageway 22 extending axially therethrough. The outlet member 20 also has a plurality of projections or barbs 24 extending radially outwardly for attachment to a conduit (not shown). The outlet member 20 also receives the check valve 10 to be described in the passageway 22. It should be appreciated that the fuel flowing to the outlet section 18 flows into the outlet member 20 and through the passageway 22 and the check valve 10 when open to the conduit. It should also be appreciated that, except for the check valve 10, the fuel pump 12 is conventional and known in the art.

Referring to FIGS. 1 through 3, the check valve 10 includes a valve housing 26 extending axially and disposed in the passageway 22 of the outlet member 20. The valve housing 26 has a body portion 28 that is generally tubular in shape and has a generally circular cross-sectional shape. The body portion 28 extends axially and has a passageway 30 extending axially therethrough with an enlarged portion 32 at one end. The body portion 28 also has a flow tube 34 extending axially at the other end thereof for a function to be described. The valve housing 26 is made of a rigid material such as metal or plastic, preferably brass. It should also be appreciated that the valve housing 26 is a monolithic structure being integral, unitary, and one-piece.

The check valve 10 includes a valve seat 36 disposed adjacent the passageway 30 and formed on the valve housing 26 adjacent the flow tube 34 of the valve housing 26. The valve seat 36 has a generally frusta-conical cross-sectional shape for a function to be described. The valve seat 36 is made of a rigid material such as metal or plastic, preferably brass. It should be appreciated that the valve seat 36 and valve housing 26 are a monolithic structure being integral, unitary, and one-piece.

The check valve 10 also includes a valve member 38 disposed in the valve housing 26 and cooperating therewith. The valve member 38 is of a pintel type and extends axially. The valve member 38 has a hub 40. The hub 40 has a generally hemi-spherical shape. The hub 40 has an annular groove 42 for a function to be described. The valve member 38 also has a stem 44 extending axially from the hub 40. The stem 44 is generally cylindrical with a generally circular cross-sectional shape. The stem 44 is disposed in the passageway 30 of the valve housing 26 for sliding movement therein. The stem 44 has a length to diameter ratio greater than a predetermined amount such as four (4) to provide balance between valve length and stem diameter, resulting in better stability and/or reduction of wobble/rattle in the fluid stream. The valve member 38 has a flange 46 extending radially from the stem 44 at one end and disposed annularly thereabout for a function to be described. The valve member 38 also has a passageway or flow port 48 extending axially into the stem 44. The valve member 38 may also have at least one aperture or outlet port 50 extending diametrically or radially therein and communicating with the flow port 48. The outlet port 50 is generally circular in cross-sectional shape. The valve member 38 is made of a rigid material such as plastic. The hub 40 of the valve member 38 travels within the flow tube 34 of the valve housing 26. It should be appreciated that the flow tube 34 provides a constant annular flow area between an outside diameter of a seal 51 to be described and an inside diameter of the flow tube 34, thus eliminating the oscillation of the valve member 38 that can be caused by sudden changes in flow area.

The check valve 10 includes a seal 51 disposed in the groove 42 of the valve member 38 to engage the valve seat 36 when the valve member 38 is in a closed position. The seal 51 is of an o-ring type and made of an elastomeric material. The valve member 38 has a first or closed position with the seal 51 cooperating with the valve seat 36 to close the passageway 30 of the valve housing 26 as illustrated in FIG. 2. The valve member 38 has a second or open position cooperating with the valve housing 26 to open the passageway 30 of the valve housing 26 as illustrated in FIG. 3. It should be appreciated that the outlet port 50 is located upstream of the seal 51 so that the checking characteristic of the valve member 38 is maintained. It should also be appreciated that the stem 44 of the valve member 38 has a close fit to the passageway 30 of the valve housing 26 to block the outlet port 50 of the valve member 38. It should further be appreciated that the valve member 38 must travel a predetermined dwell distance such as 0.3 millimeters before the outlet port 50 is exposed and flow can exit past the valve seat 36 through the passageway 30 when the valve member 38 is in the open position as illustrated in FIG. 3. It should still be further appreciated that, when the valve member 38 has traveled the predetermined dwell distance, the seal 51 has lifted away from the valve seat 36, creating a flow area large enough to prevent a venturi that limits travel and causes high flow restriction.

The check valve 10 further includes a spring 52 to urge the valve member 38 and seal 51 toward the valve seat 36. The spring 52 is of a coil type. The spring 52 is disposed about the stem 44 of the valve member 38 between the flange 46 and a surface 54 of the enlarged portion 32 of the passageway 30 of the body portion 28 of the valve housing 26. It should be appreciated that the spring 52 urges the valve member 38 and seal 51 to engage the valve seat 36 in a closed position. It should also be appreciated that the spring 52 is conventional and known in the art.

In operation, the check valve 10 is in an assembled state in which the valve housing 26 is disposed in the passageway 22 of the outlet member 20 of the fuel pump 12. The seal 51 engages the valve seat 36 and the valve member 38 is in the closed position as illustrated in FIG. 2. The seal 51 is contained on the valve seat 36 and the valve member 38 is maintained in the closed position by the spring force of the spring 52.

During high forward flow conditions, the valve member 38 is dislodged from the closed position and travels in the flow direction away from the valve seat 36. Fuel enters the outlet member 20 when the fuel is pumped by the pump section 14 past the motor section 16 to the outlet section 18. In normal operating conditions where the flow of the fuel pump 12 is greater than 20 kPa. to the check valve 10, fuel flows, as indicated by the arrows in FIG. 3, to the flow port 48 of the valve member 38 and causes the valve member 38 to move away from the valve seat 36. The valve member 38 moves to an open position, which is the maximum position desired off of the valve seat 36. In the open position, the valve member 38 allows fuel to flow through the outlet port 50 and around the hub 40 of the valve member 38 and past the flow tube 34 of the valve housing 26. Fuel flows from the check valve 10 through the passageway 22 of the outlet member 20 to the conduit. In the open position, the valve member 38 is contained and retained in the center of the fuel flow stream by the flow tube 34. At low flow conditions, the position of the valve member 38 is determined by the spring rate of the spring 52 and distance of the valve member 38 and seal 51 off of the valve seat 36. In the open or retained position, the valve member 38 has a low co-efficient of drag and low flow restriction versus differential pressure across the valve member 38 compared to current conventional check valves.

Referring to FIG. 4, another embodiment, according to the present invention, of the check valve 10 is shown. Like parts of the check valve 10 have like reference numerals increased by one hundred (100). In this embodiment, the check valve 110 is illustrated with the valve housing 126, passageway 130, valve member 138, and spring 152. The check valve 110 includes a metered outlet port 150 disposed in the valve member 138. The outlet port 150 has a metered profile such as a generally triangular cross-sectional shape. The flow area of the outlet port 150 increases at a rate governed by the geometry of the outlet port 150 and travel of the valve member 138. By changing the shape of the outlet port 150, the flow area versus travel characteristics of the valve member 138 can be optimized for various applications. The operation of the check valve 110 is similar to the operation of the check valve 10.

Referring to FIGS. 5 and 6, yet another embodiment, according to the present invention, of the check valve 10 is shown. Like parts of the check valve 10 have like reference numerals increased by two hundred (200). In this embodiment, the check valve 210 is illustrated with the valve housing 226, valve seat 236, valve member 238, seal 251, and spring 252. The check valve 210 includes a plurality of, preferably opposed outlet ports 250 disposed in the valve member 238. The outlet ports 250 have a generally circular shape. The flow area of the outlet ports 250 increases at a rate governed by the geometry of the outlet port 250 and travel of the valve member 238. The operation of the check valve 210 is similar to the operation of the check valve 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A check valve for a fuel pump comprising:
   a valve housing adapted to be disposed in an outlet member of the fuel pump;
   a valve seat formed on an interior surface of said valve housing, said valve seat having a generally frustaconical cross-sectional shape;
   a valve member disposed in said valve housing and having a closed position to engage said valve seat to prevent fuel from flowing through the outlet member and an open position to allow fuel to flow through the outlet member, said valve member having a hub with a generally hemi-spherical shape and an annular groove extending radially into said hub and a seal disposed in said groove for contacting said valve seat when said valve member is in said closed position;
   a spring disposed about said valve member and located axially between said valve seat and one end of said valve housing to urge said valve member toward said valve seat; and
   said valve member having at least one outlet port disposed below said groove and located axially between said valve seat and the one end of said valve housing when said valve member is in said closed position to prevent fuel flow, said valve member traveling a predetermined dwell distance before said outlet port is exposed and fluid flow can exit past said valve seat when said valve member is in said open position, creating a flow area large enough to prevent a venturi that limits travel of said valve member.

2. A check valve as set forth in claim 1 wherein said valve member has a stem extending axially from said hub.

3. A check valve as set forth in claim 2 wherein said valve housing has a passageway extending axially therethrough to receive said stem.

4. A check valve as set forth in claim 1 including a flow tube at one end of said valve housing adjacent said valve seat.

5. A check valve as set forth in claim 3 wherein said valve housing has an enlarged opening at one end of said passageway.

6. A check valve as set forth in claim 5 wherein said valve member has a flange at one end of said stem opposite said hub and disposed in said enlarged diameter portion.

7. A check valve as set forth in claim 1 wherein said valve member has a flow port extending axially therein.

8. A check valve as set forth in claim 7 wherein said at least one outlet port extends radially in said valve member and communicates with said flow port.

9. A check valve as set forth in claim 1 wherein said at least one outlet port has a metered shape.

10. A fuel pump comprising:
    an outlet member having a first passageway extending therethrough;
    a valve housing disposed in said first passageway of said outlet member, said valve housing having a second passageway extending axially therethrough;
    a valve seat formed on an interior surface of said valve housing forming said second passageway, said valve seat having a generally frustaconical cross-sectional shape;
    a flow tube extending axially from one end of said valve housing adjacent said valve seat;
    a valve member disposed in said second passageway of said valve housing and having a closed position to engage said valve seat to prevent fuel from flowing through said outlet member and an open position to allow fuel to flow through said outlet member;
    a spring disposed about said valve member and located axially between said valve seat and one end of said valve housing to urge said valve member toward said valve seat; and
    said valve member having a hub with a generally hemi-spherical shape and an annular groove extending radially into said hub and a seal disposed in said groove for contacting said valve seat when said valve member is in said closed position and a flow port extending therein with at least one outlet port having a metered shape disposed below said groove and located axially between said valve seat and the one end of said valve housing when said valve member is in said closed position to prevent fuel flow, said valve member traveling a predetermined dwell distance before said outlet port is exposed and fluid flow can exit past said valve seat when said valve member is in said open position, creating a flow area large enough to prevent a venturi that limits travel of said valve member.

11. A fuel pump as set forth in claim 10 wherein said valve housing has an enlarged opening at one end of said second passageway and said valve member has a flange at one end and disposed in said enlarged diameter portion.

12. A fuel pump comprising:
    a pump section at one axial end;
    a motor section adjacent said pump section;
    an outlet section adjacent said motor section at the other axial end, said outlet section including an outlet member having a first passageway therethrough;
    a valve housing disposed in said first passageway of said outlet member, said valve housing having a body portion with a second passageway extending axially therethrough;
    a flow tube extending axially from one end of said body portion;
    a valve seat disposed adjacent said second passageway and formed on said valve housing adjacent said flow tube, said valve seat having a generally frustaconical cross-sectional shape;
    a valve member disposed in said second passageway of said valve housing and having a closed position to engage said valve seat to prevent fuel from flowing through the outlet member and an open position to allow fuel to flow through the outlet member;
    said valve member having a hub with a generally hemi-spherical shape and an annular groove extending radially into said hub;

a seal disposed in said groove for contacting said valve seat when said valve member is in said closed position;

said valve housing having an enlarged opening at one end of said second passageway and said valve member having a flange at one end and disposed in said enlarged diameter portion;

a spring disposed about said valve member and located axially between said flange and surface of the enlarged diameter portion to urge said seal and valve member toward said valve seat; and said valve member having a flow port extending therein with at least one outlet port disposed below said groove and located axially between said valve seat and one end of said valve housing when said valve member is in said closed position to prevent fuel flow, said valve member traveling a predetermined dwell distance before said outlet port is exposed and fluid flow can exit past said valve seat when said valve member is in said open position, creating a flow area large enough to prevent a venturi that limits travel of said valve member.

* * * * *